Patented Apr. 5, 1949

2,465,988

UNITED STATES PATENT OFFICE 2,465,988

2,5-DIALKOXY TETRAHYDROFURANS AND METHODS FOR MAKING THEM

David Gwyn Jones, Norton-on-Tees, England, assignor to Imperial Chemical Industries Limited, a corporation of Great Britain No Drawing. Application December 22, 1947, Serial No. 793,321. In Great Britain April 17, 1946

16 Claims. (Cl. 260—345)

This invention relates to the production of saturated heterocyclic compounds containing an oxygen atom in the ring.

According to the present invention there is provided a process for the production of saturated heterocyclic compounds having the formula

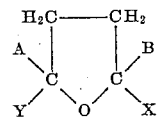

which comprises hydrogenating compounds of the type

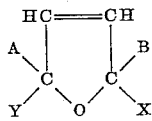

in the presence of a hydrogenating catalyst comprising a metal or metals belonging to group VIII of the periodic table, where A and B are alkoxy or hydroxy groups, and X and Y may be hydrogen, or a saturated hydrocarbon radicle or a saturated group containing carbon, hydrogen and oxygen only. In particular X and Y may be $CH_3$, $C_2H_5$, $COOCH_3$ or $COOC_2H_5$. When A or B is alkoxy, it is preferable that the alkoxy group should not contain more than 5 carbon atoms.

The process is of especial value when X and Y are hydrogen atoms or Y is hydrogen and X is the methyl group. The products, many of which are believed to be new compounds, are valuable as chemical reactants and intermediates, for example, in the production of dicarbonyl compounds by hydrolysis as disclosed in co-pending British application No. 27,702/45.

The process may be conducted in the vapour or liquid phase, and at atmospheric or superatmospheric pressure. In the liquid phase process it is preferred to operate within the temperature range, 20° C.–130° C. Above 130° C. there is tendency for ring fission to occur, especially when superatmospheric pressure is employed. Superatmospheric pressures of up to 250 atmospheres gauge are suitable. It is convenient, because of simpler operation and apparatus, to work at atmospheric pressure.

In the vapour phase process 100°–250° C. is a suitable operating temperature.

Examples of suitable catalysts are: platinum, which may be employed in finely divided form, e. g. as platinum-on-silica-gel, platinum-on-kieselguhr, or as spongy platinum; nickel, used, for example, as Raney nickel, or supported on kieselguhr; and cobalt, used, for example as Raney cobalt or supported on kieselguhr. By Raney nickel is meant a powder catalyst prepared by removing by means of an extracting liquid substantially all the alloying metal from nickel alloys comprising nickel and a metal or metals more soluble in said extracting liquid, which may be, for example, aqueous acid or alkali. The supported catalysts may contain, for example, 5–70% by weight of the catalytic metal.

All these catalysts are suitable for batch operation. The process may, however, be operated continuously and it is then desirable to employ a foraminate catalyst as hereinafter defined, for example a foraminate nickel-aluminium, or foraminate cobalt-aluminium catalyst. By batch process is meant one in which, when operating on a starting material of substantially constant composition, the concentration of desired product at any point in the system varies with time but not with position. By continuous process, on the other hand, is meant one in which, when operating on a starting material of substantially constant composition, the concentration of desired product at any point in the system varies with position but is substantially constant with respect to time.

By the term foraminate catalyst as used in this specification is meant one comprising particles or pieces, for example, granules prepared by crushing, of an alloy comprising the desired catalytically active metal or metals together with one or more metals more soluble in acid or alkali or other extracting liquid than the desired catalytically active metal or metals, said alloy comprising at least one phase in which the atoms of the desired catalytically active metal or metals and the aforesaid more soluble metal or metals are on the same crystal lattice, and said particles or pieces having a robust core of alloy or desired catalytically active metal or metals, and an outer active layer having a skeletal structure resulting from the partial or complete removal of the more soluble metal or metals from the aforesaid phase or phases by the extracting liquid. The particles or pieces may be prepared in various ways, e. g. by crushing the cool alloy, and may be of various sizes, but are preferably 1/8"–1/4". Examples of suitable foraminate nickel catalysts are those disclosed in British specification No. 570,843, which are prepared by removing from 5 to 30% of the aluminium from nickel/aluminium alloys containing 40 to 60% by weight of nickel and 60 to 40% of aluminium by means of aqueous caustic soda; and examples of suitable foraminate cobalt catalysts are those disclosed in co-pending British application No. 13,325/46 prepared from cobalt/aluminium alloys in which the ratio Co:Al by weight is from 15:85 to 55:45, by extraction with aqueous caustic soda.

Examples of compounds that can be produced according to the process of the invention are: 2,5 - dimethoxy - 2,5 - dimethyl tetrahydrofuran from the corresponding dihydrofuran; 2,5-dimethoxy-2-methyl tetrahydrofuran from the corresponding dihydrofuran; and the methyl ester of 2,5-dimethoxy tetrahydrofuroic acid from the methyl ester of the corresponding dihydrofuroic acid. Using 2,5-dimethoxy-2,5-dihydrofuran as starting material good results have been obtained at atmospheric pressure and 30° C. employing platinum or Raney nickel catalysts, and at 30° C. and 250 atmospheres gauge employing Raney nickel.

It is preferred to conduct the liquid phase process at a pH of 7 or more, since under acid conditions there is a tendency for hydrolysis to occur and the working up of the products is more difficult. It is also preferred to conduct the vapour phase process under substantially non-acid conditions.

It is often convenient to conduct the process in the presence of an organic solvent, which should be saturated, such as an aliphatic mono-alcohol, an ether or an aliphatic ester. Ether, dioxan, tetrahydrofuran and tetrahydropyran are very suitable.

While the stoichiometric amount of hydrogen may be employed, it is preferred to employ an excess of hydrogen, for example a molar ratio to starting material of from 5:1 to 7:1. In continuous operation the substituted 2,5-dihydrofuran may be fed at a liquid space velocity of up to 1 litre per litre of bulk catalyst volume per hour, that is 1 hour$^{-1}$, or even more.

The invention is illustrated but not limited by the following examples.

*Example 1*

25 mls. of 2,5-dimethoxy-2,5-dihydrofuran, 100 mls. of methanol, 1 gm. of sodium carbonate and 1 gm. of Raney nickel catalyst were stirred in an atmosphere of hydrogen at atmospheric pressure at about 20° C. When the stoichiometric amount of hydrogen, as indicated by a gas meter, had been absorbed the product was separated from the catalyst and distilled under atmospheric pressure. 2,5-dimethoxy-tetrahydrofuran was obtained in good yield.

*Example 2*

150 gms. of 2,5-dimethoxy-2,5-dihydrofuran dissolved in 200 mls. of methanol was hydrogenated at 30° C. and at 30–50 atmospheres gauge in the presence of 20 gms. of a nickel-on-kieselguhr catalyst containing 37% by weight of nickel. 2,5-dimethoxy-tetrahydrofuran was obtained in 85% yield.

I claim:

1. A process for the production of saturated heterocyclic compounds having the formula

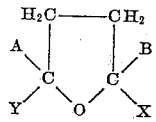

which comprises hydrogenating compounds of the type

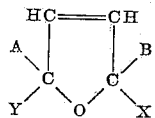

in the presence of a hydrogenating catalyst comprising a metal selected from group VIII of the periodic table, where A and B are alkoxy, and X and Y are selected from the group consisting of hydrogen, alkyl and alkyl carboxylates having the formula COOR wherein R is an alkyl radical.

2. A process as claimed in claim 1 wherein A and B are alkoxy groups containing up to and including 5 carbon atoms.

3. A process as claimed in claim 1 wherein X and Y are selected from the group consisting of H, CH$_3$, C$_2$H$_5$, COOCH$_3$ and COOC$_2$H$_5$.

4. A process as claimed in claim 1 wherein the catalyst is selected from the group consisting of platinum, nickel and cobalt.

5. A process as claimed in claim 1 wherein the pH is at least 7.

6. A process as claimed in claim 1 which is conducted in the vapor phase.

7. A process as claimed in claim 1 which is conducted in the liquid phase.

8. A process as claimed in claim 7 wherein a temperature of from 20° to 130° C. is employed.

9. A process as claimed in claim 1 which is conducted in the liquid phase and wherein atmospheric pressure is used.

10. A process as claimed in claim 1 which is conducted in the liquid phase and in which a pressure exceeding atmospheric and up to 250 atmosphere gauge is used.

11. A process as claimed in claim 1 which is conducted as a batch process in the liquid phase and in which the hydrogenating catalyst is selected from a group consisting of finely divided platinum, platinum-on-kieselguhr, spongy platinum, finely divided nickel, nickel-on-kieselguhr, finely divided cobalt and cobalt-on-kieselguhr.

12. A process as claimed in claim 1 which is conducted as a continuous process in the liquid phase and in which the hydrogenating catalyst is selected from the group consisting of foraminate nickel and cobalt.

13. A process as claimed in claim 1 which is conducted in the liquid phase and in the presence of a saturated organic solvent.

14. A process for the production of 2,5-dimethoxy-tetrahydrofuran which comprises hydrogenating 2,5-dimethoxy-2,5-dihydrofuran in the presence of a finely divided nickel catalyst and at atmospheric pressure and a temperature of about 20° C.

15. A process for the production of the 2,5-dimethoxy-tetrahydrofuran which comprises hydrogenating 2,5-dimethoxy-2,5-dihydrofuran in the presence of a nickel-on-kieselguhr catalyst and at a pressure of from 30 to 50 atmospheres gauge and a temperature of 30° C.

16. Dialkoxy tetrahydrofurans having the general formula

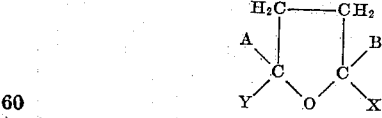

in which A and B are alkoxy groups, and X and Y are selected from the group consisting of hydrogen, alkyl and alkyl carboxylates having the formula COOR where R is an alkyl radical.

DAVID G. JONES.

REFERENCES CITED

The following references are of record in the file of this patent:

Komatsu et al., Bull. Chem. Soc., Japan, vol. 5, (1930), pages 241–248.